US009103951B2

(12) United States Patent
Yan et al.

(10) Patent No.: US 9,103,951 B2
(45) Date of Patent: Aug. 11, 2015

(54) LIGHT GUIDE PLATE, AND METHOD AND MOLD FOR MANUFACTURING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Kai Yan, Beijing (CN); Kun Lu, Beijing (CN); Zhanchang Bu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/052,291

(22) Filed: Oct. 11, 2013

(65) Prior Publication Data

US 2014/0104884 A1    Apr. 17, 2014

(30) Foreign Application Priority Data

Oct. 11, 2012    (CN) .......................... 2012 1 0384471

(51) Int. Cl.
*F21V 8/00*        (2006.01)
*B29C 33/00*    (2006.01)
*B29C 33/42*    (2006.01)
(Continued)

(52) U.S. Cl.
CPC .............. *G02B 6/0011* (2013.01); *B29C 33/00* (2013.01); *B29C 33/42* (2013.01); *G02B 6/0018* (2013.01); *G02B 6/0096* (2013.01); *B29C 2045/0087* (2013.01); *B29L 2011/0075* (2013.01); *G02B 6/0065* (2013.01)

(58) Field of Classification Search
CPC ................................. G09F 13/18; F21V 5/002
USPC .......................................................... 362/621
See application file for complete search history.

(56) References Cited

U.S. PATENT DOCUMENTS 5,833,878 A * 11/1998 Shinohara ................ 252/299.01
6,669,350 B2 * 12/2003 Yamashita et al. ............ 362/612
2005/0175282 A1    8/2005 Wright et al.
(Continued)

FOREIGN PATENT DOCUMENTS

CN        2298941 Y        12/1998
CN        1639508 A        7/2005
(Continued)

OTHER PUBLICATIONS

Second Chinese Office Action dated May 12, 2014; Appln. No. 201210384471.8.
(Continued)

*Primary Examiner* — Mary Ellen Bowman
(74) *Attorney, Agent, or Firm* — Ladas & Parry LLP

(57) ABSTRACT

The present invention provides a light guide plate and a method and a mold for manufacturing the same. The light guide plate comprises at least one incident surface, an exiting surface and a bottom surface, the exiting surface and bottom surface being disposed facing to each other and both being connected to the incident surface, the light guide plate having a cavity formed therein, wherein light incident from the incident surface exits the exiting surface after refracted and/or reflected by the cavity. With the light guide plate, light energy loss can be reduced and brightness of pictures can be improved.

7 Claims, 4 Drawing Sheets

(51) Int. Cl.
*B29L 11/00* (2006.01)
*B29C 45/00* (2006.01)

(56) References Cited

U.S. PATENT DOCUMENTS

2005/0285287 A1 12/2005 Okumura et al.
2010/0327491 A1 12/2010 Nagashima

FOREIGN PATENT DOCUMENTS

CN 1715033 1/2006
CN 101934571 1/2011

OTHER PUBLICATIONS

First Chinese Office Action dated Sep. 6, 2013: Appln. No. 201210384471.8.
Third Chinese Office Action Appln. No. 201210384471.8; Dated Nov. 2, 2014.
Fourth Chinese Office Action dated Mar. 26, 2015; Appl. No. 201210384471.8.

* cited by examiner

LIGHT GUIDE PLATE, AND METHOD AND MOLD FOR MANUFACTURING THE SAME

BACKGROUND

The present invention relates to display technology field, particularly to light guide plate and method and mold for manufacturing the same.

In the existing liquid crystal displays, a side-lit type backlight module 1, as shown in FIG. 1, comprises a back plate 10, a bottom reflection sheet 11, lattice points 12, a light guide plate 13, a light source 14, a diffusion plate 15, optical sheets 16 and a frame 17.

In the side-lit type backlight module 1, the light emitted by cold cathode fluorescent lamp or light emitting diode which serves as the light source 14 enters the light guide plate 13 from its sides. After passing through the light guide plate 13 and the reflected at the lattice points 12 on the bottom surface of the light guide plate, part of the incident light exits the top face of the light guide plate 13. The other part of the light gets to the surface of the bottom reflection sheet 11 after refraction, reflected on the bottom reflection sheet 11, back into the light guide plate 13 again, and exits the top face of the light guide plate 13. Meanwhile, the light exiting the top face of the light guide plate 13 is diffused and converged by sheets (any combination of the diffusion plate 15, the optical sheets 16 and protective sheets) disposed above the light guide plate 13, making optical pictures uniform and the center of the pictures sufficiently bright. The optical sheets generally are prism sheets and/or brightness enhancement sheets.

Because the raw material for a light guide plate used in liquid crystal display industry is mainly polymethyl methacrylate which has optical properties including: transmittivity of 92%, index of refraction of 1.49, and thus there is a 8% of light energy lost due to absorption by the light guide plate and the brightness of the picture will be decreased when a beam of light exits the light guide plate. However, the loss of light energy can be compensated only by adding an optical sheet having a gain of about 10% and this will increase the manufacturing cost and make the product less competitive.

SUMMARY

According to the present invention, a light guide plate, a method and a mold for manufacturing the same are provided, which can reduce light energy loss, improve brightness of pictures, lower manufacturing cost and improve competitive ability of the products.

According to embodiments of the present invention, a light guide plate is provided, which comprises at least one incident surface, an exiting surface and a bottom surface, the exiting surface and the bottom surface being disposed facing to each other and being both connected to the incident surface, wherein the light guide plate has a cavity formed in it, wherein incident light from the incident surface exits the exiting surface after refracted and/or reflected by the cavity.

Preferably, at least one side face of the cavity comprises at least one curved surface convex toward the interior of the cavity, and the at least one side face is parallel to the incident surface.

The curved surface convex toward the interior of the cavity can be hemispherical, conical or polyhedral.

Preferably, the hemispherical shape of the curved surface convex toward the interior of the cavity has a diameter between 50 micron and 60 micron and a height between 10 micron and 15 micron.

Preferably, the cavity has a thickness in a direction perpendicular to the exiting surface that is greater than or equal to 2 mm.

According to embodiments of the present invention, a moulding mode is further provided, which is injection moulding mode or extrusion mold, used for forming light guide plate, wherein the moulding mode comprises a first sub-mold that is provided with a first cavity and a second sub-mold, and the second sub-mold can be placed in the first cavity to form a first clearance between the second sub-mold and the first sub-mold so that the light guide plate to be formed in the first clearance has a second cavity.

Preferably, the moulding mode further comprises: at least one third sub-mold whose shaping face comprises at least one curved surface concave toward the interior of the third sub-mold, wherein the third sub-mold is disposed in the first clearance and contacts with the second sub-mold, and a second clearance is formed between the shaping face of the third sub-mold and the first sub-mold, so that a side face of the second cavity in the light guide plate that is formed in the second clearance comprises at least one curved surface convex toward the interior of the second cavity.

According to embodiments of the present invention, a method for manufacturing a light guide plate is provided, which comprises the following steps:

providing an injection mold, which comprises a first sub-mold that is provided with a first cavity; and a second sub-mold that is disposed in the first cavity, a first clearance being formed between the second sub-mold and the first sub-mold;

melting resin material and injecting the melt resin material into the first clearance; and taking out the resin material from the first clearance after injection molding.

According to embodiments of the present invention, another method for manufacturing a light guide plate is provided, which comprises the following steps:

providing an injection mold, which comprises a first sub-mold that is provided with a first cavity; a second sub-mold that is disposed in the first cavity, a first clearance being formed between the second sub-mold; and at least one third sub-mold that is disposed in the first clearance and contacts with the second sub-mold, a shaping face of the third sub-mold comprising at least one curved surface concave toward the interior of the third sub-mold, and a second clearance being formed between the shaping face of the third sub-mold and the first sub-mold.

melting resin material and injecting the melt resin material into the second clearance; and taking out the resin material from the second clearance after injection molding.

According to embodiments of the present invention, a further method for manufacturing a light guide plate is provided, which comprises the following steps:

providing an extrusion mold, which comprises an extruding mouth mold that is provided with a first cavity; and a second sub-mold that is disposed in the first cavity, a first clearance being formed between the second sub-mold and the extruding mouth mold;

melting resin material and injecting the melt resin material into the first clearance; and extruding the resin material from the first clearance so that the light guide plate extruded from the first clearance has a second cavity.

Preferably, the method for manufacturing a light guide plate further comprises: using a shaping face of a third sub-mold to thermal press at least one side face of the second cavity after extruding the resin material so that the at least one side face of the second cavity faints a curved surface convex toward the interior of the second cavity, the shaping face of the third sub-mold comprising at least one curved face concave toward the interior of the third sub-mold.

BRIEF DESCRIPTION OF THE DRAWINGS

In order to clearly illustrate the technical solution of the embodiments of the invention, the drawings of the embodiments will be briefly described below; and it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

What is to be noted is that the terms "top", "bottom", "left", "right" and the like are just used for references, not indicating a specific orientation. Besides, the present invention uses liquid crystal displays as examples for illustration; however, the application of the direct-down type backlight module is not limited to liquid crystal displays, and it also can be applied to other displays with providing the backlight module as the light source.

Figure 1:
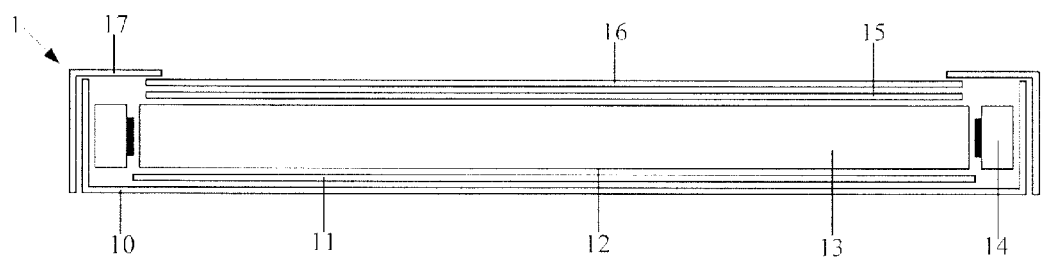
FIG. 1 is a schematic structural view of the side-lit type backlight module of the prior art.
Figure 2:
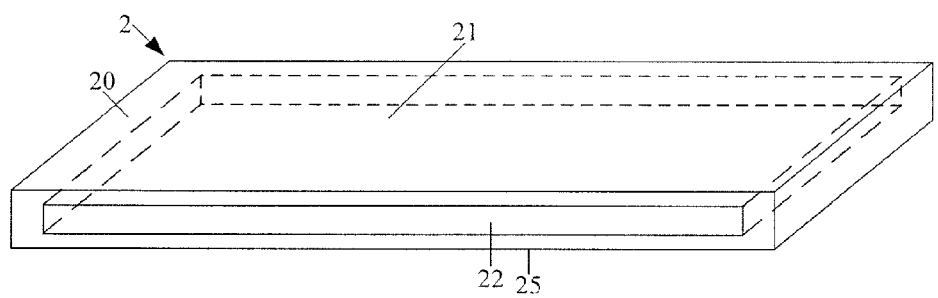
FIG. 2 is a schematic structural view of the light guide plate according to the first embodiment of the present invention.

FIG. 2 is a schematic structural view of the light guide plate in accordance with the first embodiment of the present invention. As shown in the Figure, a light guide plate 2 according to this embodiment of the present invention comprises at least one incident 2 according to this embodiment of the present invention comprises at least one incident surface 20, an exiting surface 21 and a bottom surface 25. The exiting surface and bottom surface are disposed facing to each other and both are connected to the incident surface 20. The light guide plate has a cavity 22 formed therein. The light incident from the incident surface 20 exits the exiting surface 21 after refracted and/or reflected by the cavity 22.

It is also to be noted that, the structure of the cavity in FIG. 2 is just exemplary. The structure of the cavity may be adaptively adjusted according to the specific design of the light guide plate. Because the structure provided in the embodiment of the present invention is cuboid, the cavity structure provided in the embodiment can also be in cuboid shape. For example, if the structure of the light guide plate is wedge-shaped, the structure of the cavity can also be adjusted adaptively into wedge-shape. Because of the light guide plate provided in the embodiment of the present invention decreases the light energy loss and saves the cost only by forming cavity in the light guide plate, the structure of the cavity in the light guide plate could be of any shape to satisfy the design requirement, but this is not limitative to the present invention.

Figure 3:
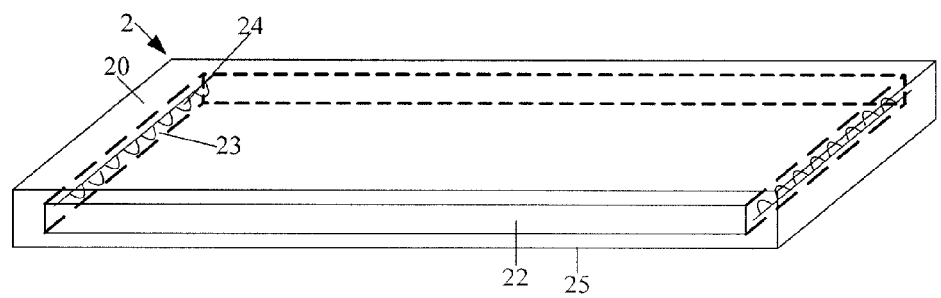
FIG. 3 is a schematic structural view of the light guide plate according to the second embodiment of the present invention.

FIG. 3 is a schematic structural view of the light guide plate in accordance with the second embodiment of the present invention. Furthermore, as shown in FIG. 3, at least one side face 23 of the cavity 22 in the light guide plate 2 includes at least one curved surface 24 convex toward the interior of the cavity 22, wherein the side face 22 is parallel to the incident surface 20.

It is to be noted that the quantity of the curved face convex to the interior of the cavity is determined by the length and the width of the light guide plate and the size of the aforementioned curved surface itself, that is, by the size of the interior cavity of the light guide plate. Therefore, the present invention does not limit the quantity of the curved faces convex toward the interior of the cavity.

Figure 4:
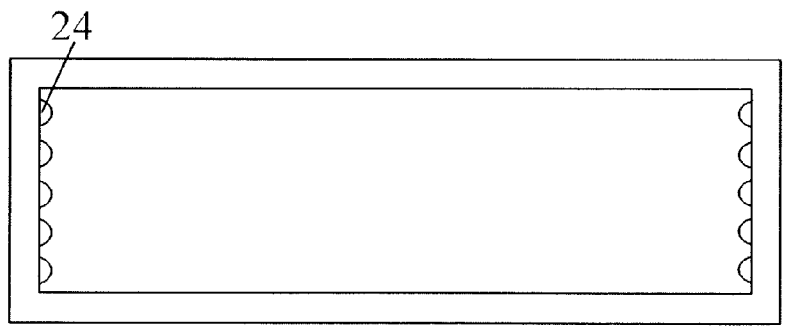
FIG. 4 is a schematic structural view of an example of the convex curved surface that is formed on the side face of the cavity of the light guide plate in accordance with the second embodiment of the present invention.
Figure 5:
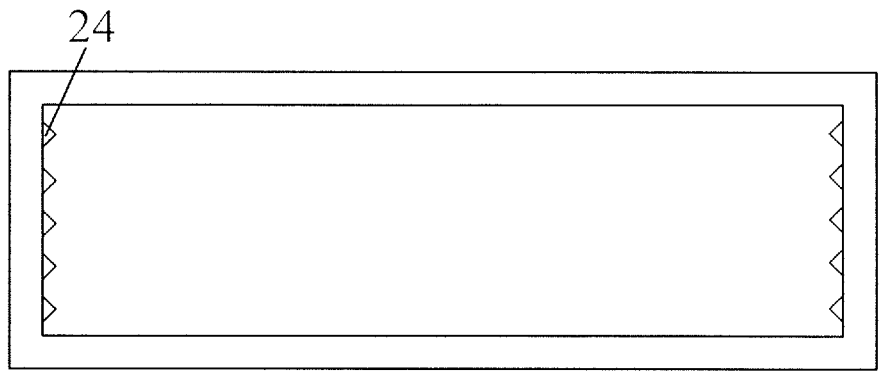
FIG. 5 is another view of another example of the convex curved face that is formed on the side face of the cavity of the light guide plate in accordance with the second embodiment of the present invention.
Figure 6:
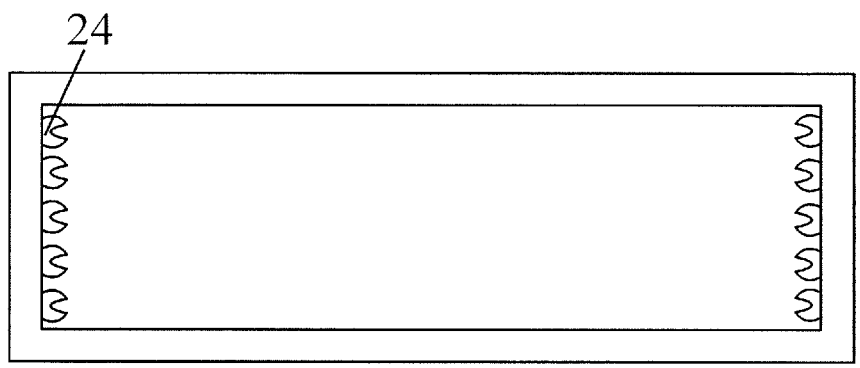
FIG. 6 is a further structural view of a further example of the convex curved surface that is formed on the side face of the cavity of the light guide plate in accordance with the second embodiment of the present invention.

Furthermore, the curved surface convex to the interior of the cavity may be hemispherical, conical or polyhedral. FIG. 4 to FIG. 6 illustrate different structures of the convex curved faces, respectively.

Exemplarily, the structure of the aforementioned curved surface 24 convex to the interior of the cavity may be the hemispherical as shown in FIG. 4, or may be the conical as shown in FIG. 5, or may be the polyhedral as shown in FIG. 6 or any other shapes that satisfies design requirements. Since the effect of the curved faces are mainly to scatter the incident light, thus the present invention does not limit the structures of the aforementioned curved surfaces.

Furthermore, the thickness of the cavity 22 in a direction perpendicular to the exiting surface may be greater or equal to 2 mm.

It is to be noted that the thickness of the cavity would better be greater than 2 mm in order to decrease the difficulty of the manufacturing of the cavity and ensure the manufacturing yield. In accordance with the technical solution of the present invention, the thickness of the cavity cannot be greater than the thickness of the light guide plate.

Furthermore, the hemispherical shape of the curved surface convex toward the interior of the cavity can have a diameter between 50 micron and 60 micron and a thickness between 10 micron and 15 micron.

Figure 7:
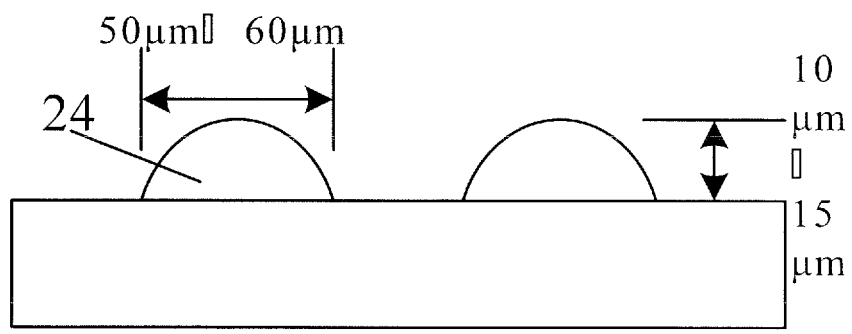
FIG. 7 is a schematic view of the size of the convex curved face that is formed on the side face of the cavity of the light guide plate in accordance with the second embodiment of the present invention.

Exemplarily, as shown in FIG. 7, the curved faces 24 convex toward the interior of the cavity 22 are hemispherical, the hemispherical shape 24 can have a diameter between 50 micron and 60 micron and a height between 10 micron and 15 micron.

It is to be noted that, in practical manufacturing, the size of the aforementioned curved surfaces convex toward the interior of the cavity can be adaptively adjusted according to the capacity of producing moulding mode of the manufacturer that producing the structures of the curved faces, so that the present invention does not make limitation on this.

Preferably, the material of the light guide plate 2 may be polymethyl methacrylate which has the best optical property. However, the material of the light guide plate can also be other materials such as polycarbonate, and the present invention does not make limitation on this.

In order to explain the light guide plate provided by the embodiment in the present invention is better than light guide plates in the prior art more comprehensively, following is the comparison between the light guide plate provided by the embodiment in the present invention is better than light guide plates in the prior art.

The complete cavity in the prior art means direct removal of the light guide plate. The light cannot get into the cavity by side-lit type and be transmitted to emit through the top face if there is no special design on the structure of the backlight module with the light guide plate being directly removed, and so the picture is in poor quality and is difficult to be seen. The light guide plate in the prior art means that being provided with a complete light guide plate. Because of the existence of the lattice points at the bottom of the light guide plate, the quality of the picture is better. However, due to the higher cost of the material of the light guide plate, the product is less competitive.

With a complete cavity, the optical picture cannot be seen without changing the backlight module, and this has no comparability. As shown in Table 1, following is the performance data comparison between two different structures of light guide plate of both the prior art and the present invention in practical test.

TABLE 1

| Items | Light guide plate of the prior art | Light guide plate of the present invention | Supplemental explanation |
|---|---|---|---|
| Utilization ratio of light | 90% | 93.6% | — |
| Color Uniformity | Pass | Pass | — |
| Brightness of the center point | 250 Nit | 260.1 Nit | the theoretical value is 8% higher than the experimental value |
| Uniformity | >75% | >75% | The standard is larger than 75% |
| Color reproduction | Pass | Pass | — |
| Thickness of the entire backlight module | 9.6 mm | 9.6 mm | The thickness is constant |
| Overall weight | 2200 g | 2080 g | Less weight |

The light guide plate with cavity structure provided according to the embodiment of the present invention can not only ensure most part of light can incident from a side face and turn to exit through the top face, but also save the material and lower the cost. It could be seen that the embodiment of the present invention provides a light guide plate having higher utilization ratio, brighter center point and less overall weight than light guide plates in the prior art. Therefore, using the light guide plate in the embodiment of the present invention will not only decrease the lost of light energy, increase the brightness at the center point of the picture, but also lower the cost and improve the competitiveness of the product.

The light guide plate provided according to the embodiment of the present invention comprises at least one incident surface, an exiting surface and a bottom surface, and the exiting surface and the bottom surface are disposed facing to each other and both are connected to the incident surface, wherein the light guide plate has a cavity formed therein, and the incident light from the incident surface after refracted and/or reflected by the cavity exit through the exiting surface. Using the light guide plates provided according to the first embodiment and the second embodiment of the present invention, it is possible to achieve one or more of the following benefits: 1) due to the cavity formed in the light guide plate, the adsorption of light energy by the material of the light guide plate is lowered as light enters into the light guide plate from the incident surface side so that the brightness of the light emitted from the exiting surface gets increased and then the brightness of the display gets increased; 2) due to the decreasing of the light energy loss, it is possible to lower the cost of the backlight module and decrease the use of condensing sheet; 3) the provision of the cavity enables less material get used during manufacturing the light guide plate so that the cost of the light guide plate get decreased; 4) the provision of the curved surfaces convex toward the cavity on the side face of the cavity enables the light emitted from the exiting surface of the light guide plate get more uniform.

A method for manufacturing a light guide plate is provided in accordance with embodiments of the present invention, which comprises: to form the light guide plate by using a mold, wherein, the moulding mode comprises a first sub-mold that is provided with a first cavity and a second sub-mold that is provided within the first cavity, and a first clearance is formed between the second sub-mold and the first sub-mold so that the light guide plate formed in the first clearance has a second cavity.

Following is a detailed description of the method for manufacturing the light guide plate by using two exemplary embodiments.

Third Embodiment

Light Guide Plate Formed with an Injection Molding

The method for manufacturing the light guide plate provided in accordance with the third embodiment in the present invention comprises the following steps S101-S103.

S101: providing an injection molding which comprises a first sub-mold that provided with a first cavity and a second sub-mold that is provided within the first cavity, a first clearance being formed between the second sub-mold and the first sub-mold.

Figure 8:
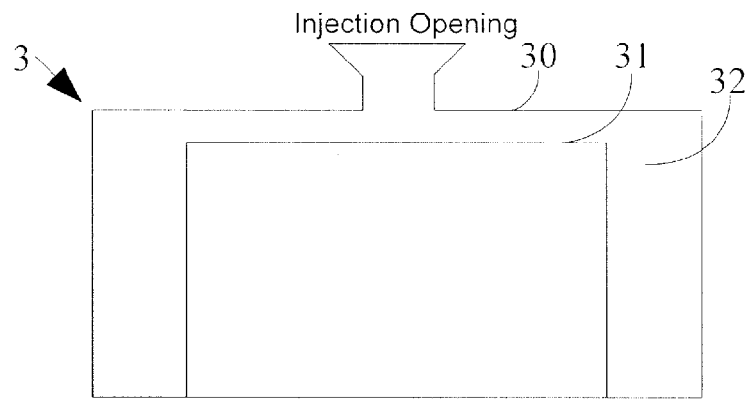
FIG. 8 is a schematic structural view of the injection moulding mode that is used in the manufacturing method for light guide plate in accordance with the third embodiment in the present invention.

Exemplarily, as shown in FIG. 8, the injection moulding mode 3 comprises a first sub-mold 30 that is provided with a first cavity and a second sub-mold 31 that is provided within the first cavity, and the first clearance 32 is formed between the second sub-mold 31 and the first sub-mold 31.

S102: melting resin material and injecting the melt resin material into the first clearance.

Melting resin material needed for the light guide plate at high temperature, and injecting the melt resin material from an injection opening of the injection moulding mode 3 into the first clearance 32 so that the light guide plate formed in the first clearance has the second cavity in it.

Exemplarily, resin material used in the embodiment of the present invention can be polymethyl methacrylate, polycarbonate or other materials that satisfy the design requirements; and the present invention is not limited at this respect.

S103: taking out the resin material from the first clearance after injection molding.

After the injection moulding mode 3 cools down, taking out the resin material from the first clearance 32 after injection molding, enabling the light guide plate formed in the first clearance 32 has the second cavity due to the second sub-mold 31.

Thus, the light guide plate shown in FIG. 2 is manufactured.

Furthermore, if it is needed to manufacture the light guide plate having at least one curved face convex toward the interior of the second cavity on at least one of the side faces of the second cavity, at least one third sub-mold is needed.

Figure 9:
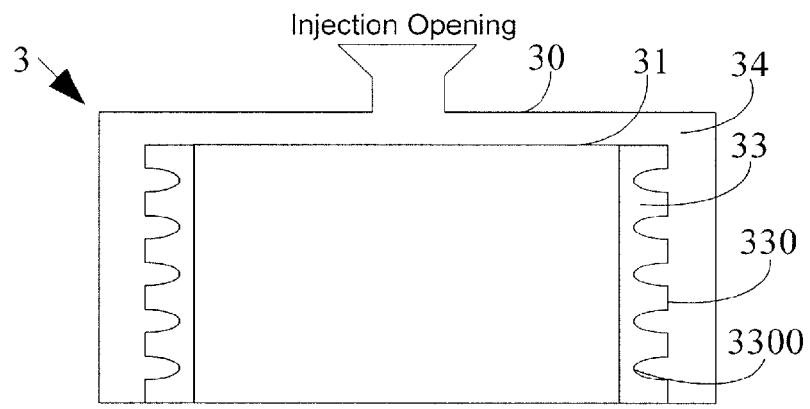
FIG. 9 is a schematic structural view of the injection moulding mode that is used in the manufacturing method for light guide plate in accordance with the third embodiment in the present invention.

Exemplary, as shown in FIG. 9, the injection moulding mode 3 further comprises at least one third sub-mold 33, a shaping face 330 of the third sub-mold 33 comprises at least one curved surface 3300 concave toward the third sub-mold 33, the third sub-mold 33 is disposed in the first clearance 32 and contacts with the second sub-mold 31, and the second clearance 34 is formed between the shaping face of the third sub-mold 330 and the first sub-mold 30 so that at least one side face of the second cavity in the light guide plate that is formed within the second clearance 34 comprises at least one curved face convex toward the interior of the second cavity.

In this condition, the method for manufacturing a light guide plate in accordance with a modification of the third embodiment of the present invention comprises the following steps S301-S303.

S301: providing an injection mold, which comprises a first sub-mold that is provided with a first cavity and a second sub-mold that is provided within the first cavity, a first clearance is formed between the second sub-mold and the first sub-mold, at least one third sub-mold that is provided within the first clearance and contacts with the second sub-mold, the shaping face of the third sub-mold comprises at least one curved surface convex toward the interior of the third sub-mold, and the second clearance is formed between the shaping face of the third sub-mold and the third sub-mold.

S302: melting resin material and injecting the melt resin material into the second clearance.

S303: taking out the resin material from the second clearance after injection molding.

Thus, the light guide plate shown in FIG. 3 is manufactured.

Fourth Embodiment

Extruding to Form the Light Guide Plate

The method for manufacturing a light guide plate in accordance with the fourth embodiment of the present invention comprises the following steps S201-S203.

S201, providing an extrusion mold, which comprises an extruding mouth mold that is provided with a first cavity and a second sub-mold that is provided within the first cavity, the first clearance is formed between the extruding mouth mold and the second sub-mold.

Figure 10:
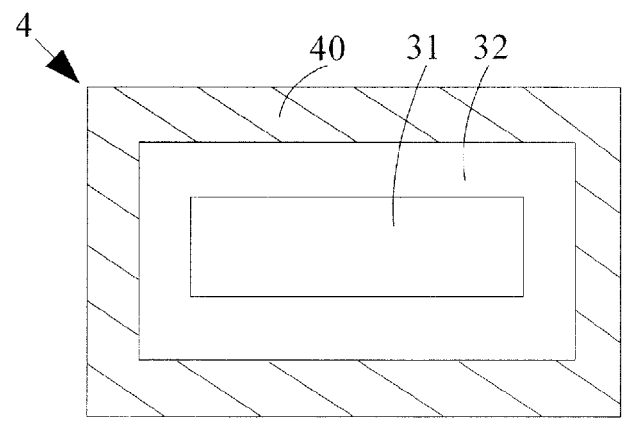
FIG. 10 is a schematic structural view of the extrusion moulding mode that is used in the manufacturing method for light guide plate in accordance with the fourth embodiment in the present invention.

Exemplarily, as shown in FIG. 10, the extrusion moulding mode 4 comprises an extruding mouth mold 40 that is provided with a first cavity and a second sub-mold 31 that is disposed in the first cavity; and a first clearance 32 is formed between the second sub-mold cavity and the extruding mouth mold 40.

S202: melting resin material and injecting the melt resin material into the first clearance.

Melting resin material needed for the light guide plate at high temperature, and injecting the melt resin material from the feeding opening of the extrusion moulding mode 4 into the first clearance 32 so that the light guide plate extruded from the first clearance 32 has a second cavity in it.

S203: extruding resin material from the first clearance so that the light guide plate extruded from the first clearance has a second cavity.

Thus, the light guide plate shown in FIG. 2 is manufactured.

Furthermore, if it is needed to manufacture the light guide plate having at least one curved face convex toward the interior of the second cavity on at least one of the side faces of the second cavity, at least one third sub-mold is needed to thermal press the light guide plate with the second cavity that is produced with steps S201 to step S203.

Exemplarily, using the shaping face 330 of the third sub-mold 33 to thermal press at least one side face of the second cavity so that at least one of the side face of the second cavity is formed with curved surfaces convex toward the interior of the second cavity, wherein, the shaping face 330 of the third sub-mold 33 comprises at least one curved face 3300 convex toward the interior of the third sub-mold.

In detail, the manufacturing method of the light guide plate in accordance with the fourth embodiment of the present invention after the step 203 can further comprises a step S204.

S204: using the shaping face of the third sub-mold to thermal press the at least one side face of the second cavity so that at least one side face of the second cavity comprises at least the curved surface convex toward the interior of the second cavity, the shaping face of the third sub-mold comprises at least one curved face convex toward the interior of the third sub-mold.

Thus, the light guide plate shown in FIG. 2 is manufactured.

Using the above method for manufacturing the light guide plate in accordance with the third embodiment and the fourth embodiment of the present invention, it is possible to achieve one or more of the following benefits: 1) due to the cavity formed in the light guide plate, when light is entering into the light guide plate from the incidence surface side, the absorption to the light energy by the material of the light guide plate is decreased so that the brightness of the light emitted from the exiting surface get increased and thus the picture brightness of the displays improved; 2) due to the decreasing of the light energy loss, it is possible to use less condensing sheets so that lower the cost of the backlight module; 3) due to the provision of the cavity, less material is used in manufacturing the light guide plate so that the cost of the light guide plate is less; 4) due to the provision of the curved surface on the side face of the cavity convex toward the interior of the cavity, the light emitted from the light guide plate is more uniform.

A backlight module is provided in accordance with the fifth embodiment of the present invention. The back light module comprises the light guide plate that is described according to the first embodiment or the second embodiment; and the light guide plate has lattice points disposed on its bottom surface.

Figure 11:
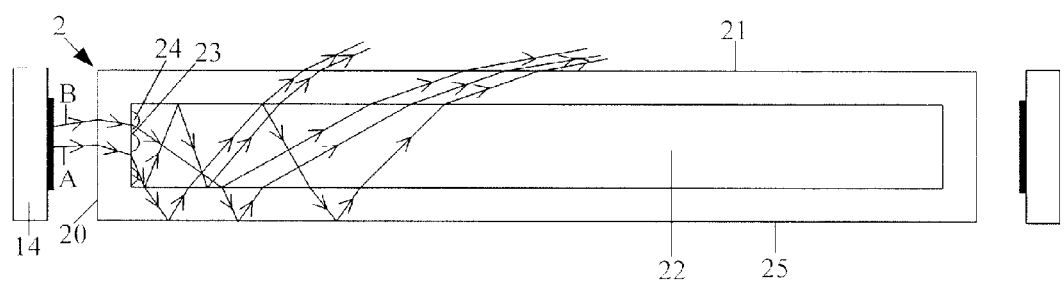
FIG. 11 is a schematic view of light propagation in the backlight module in accordance with the second embodiment of the present invention.

Exemplarily, FIG. 11 is a schematic view of light propagation in the backlight module in accordance with the second embodiment of the present invention.

As shown in FIG. 11, the light A or the light B coming from the light source 14 enters the light guide plate 2 through the incident surface 20 of the light guide plate 2. The light enters the cavity 22 in the light guide plate 2 after refraction in the light guide plate 2, and then exits through the light guide plate 2 after refraction and/or reflection at the bottom of the cavity 22 and the bottom 25 of the light guide plate 2.

It could be seen that after the light A or the light B enters into the light guide plate from the incident surface 20, because of the cavity 22 that is formed in the light guide plate 2, the absorption to the light energy by the material of the light guide plate when the light passes through the light guide plate 2 is getting less and then the picture brightness of the display is improved.

Furthermore, it could be seen that the aforementioned light B enters the light guide plate 2 from the incident surface 20, after passing through the curved face 24 which is formed on the side face 23 of the cavity 22 and convex toward the interior of the cavity 22, the refraction direction of the light B changes, which enables the light B to get to the center part of the exiting surface 21 and then exit after being reflected through the bottom face of the cavity 22 only once, so that to ensure that the energy loss of the light getting to the center part of the exiting surface 21 is small and the brightness of the center of displayed picture is enough and uniform.

It can be understand that the propagation direction and the times of refraction and/or the reflection of the aforementioned light A and the light B are just exemplary, the propagation direction of the practical light and the times of the refractions and/or the reflections depend on the practical situation.

It is to be noted that in the above embodiments light sources are disposed at shorter sides of the light guide plates. For example, the light sources can be disposed at the shorter sides of the light guide plates, respectively, as shown in FIG. 2 or FIG. 3.

However, the light source can be disposed at the longer side of the light guide plate. For example, the light source can be disposed at one or both of the two longer sides.

The backlight module provided in accordance with the embodiment of the present invention is a side-lit type backlight module; the light source used by the backlight module can be cold cathode fluorescent lamp or light emitting diodes or any other proper light sources.

Preferably, the present invention also provides a display which comprises the above mentioned backlight module. The displays can be a liquid crystal display panel, an electronic paper reader, an OLED panel, a liquid crystal display television, a liquid crystal display monitor, a digital photo frame, a cell phone, a tablet PC or any products or components with display function on it.

Although the embodiments of the invention have been described above, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A light guide plate comprises comprising at least one incident surface, an exiting surface, and a bottom surface, and side walls, the exiting surface and the bottom surface being disposed facing to each other and being both connected to the incident surface, the side walls being interposed between the exiting surface and the bottom surface and disposed on both sides of the incident surface, wherein,
the light guide plate has a cavity formed within the light guide plate and incident light from the incident surface exits the exiting surface after being refracted and/or reflected by the cavity with in the light guide plate;
at least one side face of the cavity comprises at least one curved surface convex toward an interior of the cavity, and the at least one side face is parallel to the incident surface of the light guide plate; and
the side walls and the incident surface are integrally formed, and the curved surface facing the interior of the cavity and the incident surface are integrally formed on two opposite sides of the cavity.

2. The light guide plate in accordance with claim 1, wherein the curved surface convex toward the interior of the cavity is hemispherical, conical or polyhedral.

3. The light guide plate in accordance with claim 2, wherein the hemispherical shape of the curved surface convex toward the interior of the cavity has a diameter between 50 micron and 60 micron and a height between 10 micron and 15 micron.

4. The light guide plate in accordance with claim 1, wherein the cavity has a thickness in a direction perpendicular to the exiting surface that is greater than or equal to 2 mm.

5. A moulding mold, being which is an injection moulding mold or an extrusion moulding mold and configured for forming a light guide plate, wherein the light guide plate comprises: at least one incident surface, an exiting surface, a bottom surface, and side walls, the exiting surface and the bottom surface being disposed facing to each other and being both connected to the incident surface, the side walls being interposed between the exiting surface and the bottom surface and disposed on both sides of the incident surface, wherein the moulding mold comprises a first sub-mold, which is provided with a first cavity, and a second sub-mold, and the second sub-mold is capable of being placed in the first cavity to form a first clearance between the second sub-mold and the first sub-mold so that the light guide plate having a second cavity within the light guide plate is capable of being formed in the first clearance;
the moulding mold further comprises at least one third sub-mold, a shaping face of which comprises at least one curved surface concave toward an interior of the third sub-mold, wherein the third sub-mold is disposed in the first clearance and contacts with the second sub-mold, and a second clearance is formed between the shaping face of the third sub-mold and the first sub-mold, so that a side face of the second cavity within the light guide plate that is capable of being formed in the second clearance comprises at least one curved surface convex toward an interior of the second cavity; and
the side walls and the at least one incident surface are integrally formed, and the curved surface and the incident surface are integrally formed on two opposite sides of the second cavity.

6. The light guide plate in accordance with claim 1, wherein the cavity is enclosed within the light guide plate.

7. The light guide plate in accordance with claim 1, wherein the cavity has the same shape as that of the light guide plate.

* * * * *